(No Model)

A. LUCAS.
BICYCLE SUPPORT.

No. 567,035.  Patented Sept. 1, 1896.

Witnesses
John H. Holt
John C. Wilson

Inventor
Albert Lucas
by Whitman & Wilkinson
his Attorneys

UNITED STATES PATENT OFFICE.

ALBERT LUCAS, OF MAGDEBURG, GERMANY.

BICYCLE-SUPPORT.

SPECIFICATION forming part of Letters Patent No. 567,035, dated September 1, 1896.

Application filed July 23, 1895. Serial No. 556,896. (No model.)

*To all whom it may concern:*

Be it known that I, ALBERT LUCAS, a subject of the King of Prussia, German Emperor, residing at Magdeburg, in the Kingdom of Prussia, Germany, have invented certain new and useful Improvements in a Movable Bicycle-Support; and I do hereby declare the following to be a full, clear, and exact description of the invention, such as will enable others skilled in the art to which it appertains to make and use the same.

My invention relates to improvements in bicycle-supports, and has for its object to provide a support which may be readily attached to or detached from any ordinary safety-bicycle.

My invention will be understood by reference to the accompanying drawings, wherein the same parts are indicated by the same letters throughout the several views.

Figure 1:
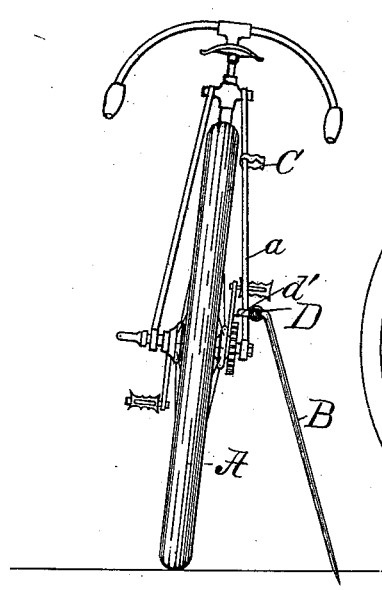
Figure 2:
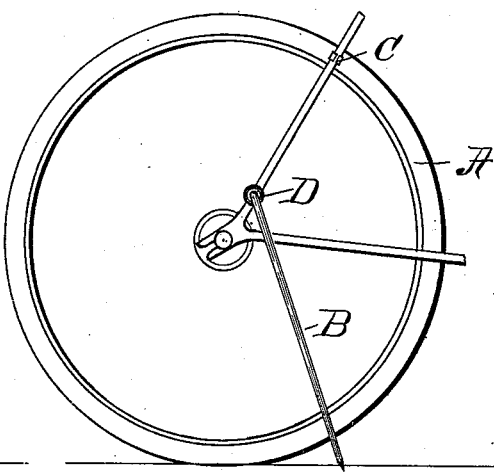
Figure 3:
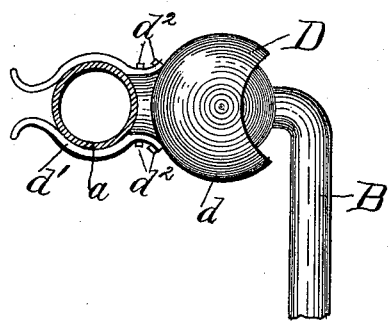
Figure 4:
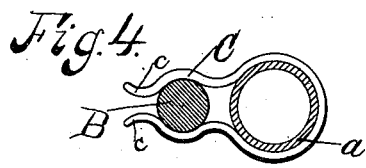
Figure 5:
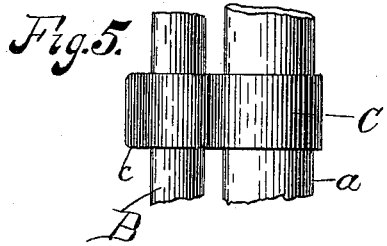

Figure 1 is a rear elevation of an ordinary bicycle as it appears when supported by the bicycle-support; Fig. 2, a side elevation of the rear portion of a bicycle as it appears when resting upon the support. Fig. 3 represents a horizontal section of the tubing of the rear fork of a bicycle, showing ball-and-socket joint and a portion of the support in side elevation. Fig. 4 represents a horizontal section of the tubing of the rear fork of the bicycle and support, showing the clamp for receiving the support or rod in plan; and Fig. 5 represents a side elevation of the same.

A is any ordinary safety-bicycle, to which the support B may be attached to either tube $a$ of the rear fork. B is a rod forming the support, which rod or support may be made of any convenient cross-section or length. C is a spring-clamp engaging the tube $a$, the jaws $c$ of which clamp having sufficient flexibility to readily admit the rod B and hold the same securely.

The rod B is attached to either side of the rear fork of a bicycle by means of a ball-and-socket joint D, securing by such a joint considerable latitude in the movement of the rod B. The socket $d$ is attached to the tube $a$ of the rear fork by means of a spring-clamp $d'$, said clamp being riveted to a shoulder on the socket $d$, as at $d^2$.

When not in use, the rod B is lifted and placed in position alongside the tube $a$ of the rear fork and held there by the clamp C.

It will be seen that I provide a neat, cheap, and simple device for supporting a bicycle, which, by reason of its being removable at will, does not encumber the bicycle, as it need only be applied to the bicycle when needed, but it may be allowed to remain upon the bicycle, should the rider so desire, and yet not be in the way.

Having thus described my invention, what I claim, and desire to secure by Letters Patent of the United States, is—

1. In a bicycle-support, the combination with the rod B, bent at its upper end and terminating at said end in a ball, of a socket D provided with a shoulder and adapted to engage the ball, and two spring-clamps rigidly secured to the shoulder on the said socket, substantially as described.

2. In a bicycle-support, the combination with a rod B, bent at right angles near one end and terminating in a ball at that end, a socket D engaging the said ball and adapted to allow a limited movement of the rod when supporting the bicycle, a shoulder concaved on one side and rigidly secured to the said socket, a spring-clip consisting of two bent arms connected to the said shoulder and adapted to engage the tubing of the rear fork of the bicycle, a spring-clip C consisting of a continuous piece of resilient material bent so as to engage the tubing of the rear fork and adapted to hold the free end of the aforesaid rod between the jaws $c$ when the said rod is not in use, substantially as described.

In testimony whereof I have signed my name to this specification in the presence of two subscribing witnesses.

ALBERT LUCAS.

Witnesses:
JULIUS MUTH,
M. C. MUTH.